Jan. 7, 1969
T. C. GERNER
3,420,586
STEERING BUSHING ASSEMBLY
Original Filed Feb. 19, 1963
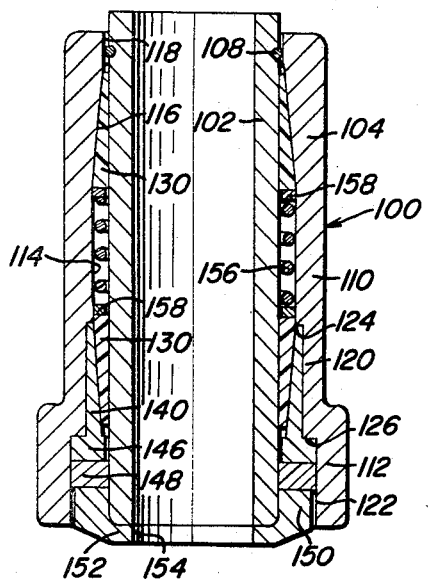
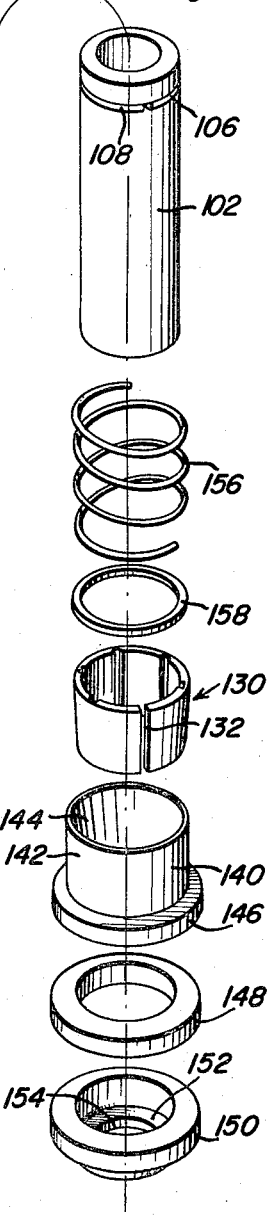
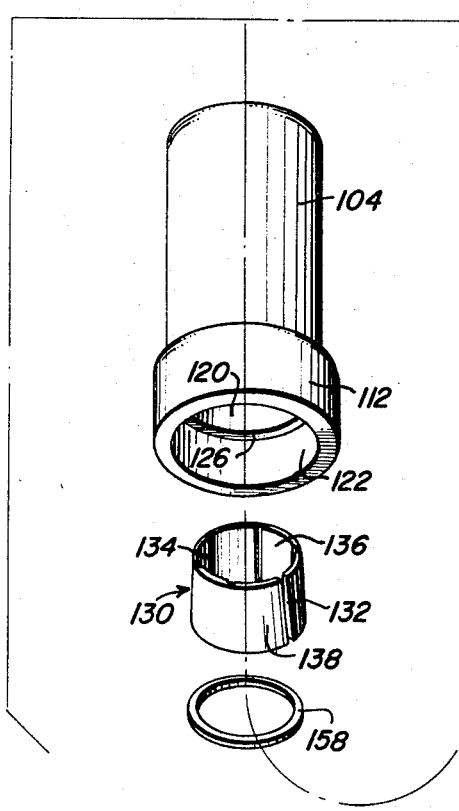
Theodore C. Gerner
INVENTOR.
BY
Attorneys

# United States Patent Office 3,420,586
Patented Jan. 7, 1969

3,420,586
STEERING BUSHING ASSEMBLY
Theodore C. Gerner, 1800 S. Broadway,
Oklahoma City, Okla. 73109
Continuation of application Ser. No. 259,502, Feb. 19,
1963. This application Sept. 6, 1966, Ser. No. 577,537
U.S. Cl. 308—70                                       6 Claims
Int. Cl. F16c 25/00

ABSTRACT OF THE DISCLOSURE

An idler arm and bracket for use in the steering linkage of an automotive vehicle in which the end of the idler arm has a bore extending therethrough receiving a hollow cylindrical spindle journaled in the bore by a pair of spaced, outwardly tapering bearing liners complementary with and engaging tapering surfaces on the bore with a coil compression spring disposed between and engaging the adjacent ends of the bearing liners to urge them outwardly into slack take-up relation between the spindle and tapering surfaces on the bore. Each bearing liner is longitudinally slit and provided with longitudinal grooves in the cylindrical inner surface thereof for rotatable supporting and bearing engagement with the outer surface of the cylindrical spindle.

---

This application is a continuation of Ser. No. 259,502 filed Feb. 19, 1963, now abandoned.

This invention comprises a novel and useful steering bushing assembly and more particularly pertains to a bushing assembly of general application for providing a rotary bearing but especially adapted to function as a bearing assembly for the pivotal connections of steering linkages of automotive vehicles.

In my prior copending application, Ser. No. 246,631, filed Dec. 21, 1962, for Idler Arm Repair Bushing, now Pat. No. 3,273,946 issued Sept. 20, 1966, there is disclosed a bushing assembly especially adapted to function as a bearing for the idler arm component of the steering linkage of an automotive vehicle. The present invention relates to a bearing and bushing assembly which is quite similar to the subject matter of and the construction set forth in my above-identified prior copending application and which may likewise be used in much the same environment as the repair bushing of that application.

Although many aspects and features of the invention set forth and claimed hereinafter are applicable to all environments in which there is desired an anti-friction bushing assembly requiring little or no lubrication, which is capable of automatically adjusting itself to compensate for wear, the primary and specifically intended object of this invention is to provide a bushing assembly specifically adapted to be inserted into the pivot connections of an automotive steering linkage system in order to recondition or replace and to constitute a bearing assembly for such linkage.

A further important object of the invention is to provide a device in accordance with the preceding object which may be equally applied either as a replacement for or a repair unit for original conventional equipment in the steering linkage assembly of an automotive vehicle or may be initially installed as original equipment therein.

A further object of the invention is to provide a bushing assembly in accordance with the preceding objects which shall include therein an automatic slack or wear take-up means to thereby greatly minimize or obviate lost motion in the bushing assembly due to the development of wear or play.

Still another purpose of the invention is to provide a bushing assembly in accordance with the preceding objects which shall be of an extremely compact size both as regards its length and diameter and may be readily applied to or removed as a unit from the mechanism with which it is associated.

Another important purpose of the invention is to provide an efficient replacement or repair bushing assembly which may be quickly and easily applied by even a semi-skilled mechanic or a mechanically minded car owner and which will restore the steering linkage connections including the idler arm anchor end to the requisite precision fit and operation that was originaly provided and intended.

A further important object of the invention is to provide a bushing assembly which shall avoid the presence of a metal-to-metal contact between bearing elements through the interposition of a non-metallic sleeve or liner therebetween which will thereby obviate the necessity for any further addition of lubricant to the bearing assembly throughout relatively long periods of use.

A further object of the invention is to provide a device in accordance with the immediately preceding object which will enable the use of plastic liner sleeves interposed between a pair of metallic bearing elements to effect an elimination of the need of lubrication of the bearing assembly and which will overcome the difficulty heretofore encountered by sleeves of such material from cold flowing or creeping and will also secure the advantages of an automatic slack or wear take-up in the assembly.

More specifically it is a primary object of the invention to provide a bearing assembly of the character above set forth which shall include a central spindle having a bushing body thereon together with a pair of bearing take-up members disposed at opposite ends of the spindle and which are resiliently urged into wear take-up positions with respect thereto by resilient means which is fully and completely enclosed within the bushing body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in vertical longitudinal section of a steering bushing assembly in accordance with this invention; and, FIGURE 2 is an exploded perspective view of the bushing assembly of FIGURE 1.

The bushing assembly is indicated generally by the numeral 100 and consists of a hollow spindle 102 upon which is mounted a bushing body 104. The spindle is cylindrical as to its interior and exterior surface and of uniform diameter throughout. At its upper end the spindle is provided with a circumferentially extending channel or groove 106 for the reception of a resilient retainer or locking ring 108.

The bushing body 104 has a cylindrical surface 110 upon the major portion of its length with its lower end being diametrically enlarged as at 112. At its mid-portion the hollow bushing body 104 has a cylindrical bore 114 which at its upper end is tapered and conical to provide an upwardly reduced conical surface 116 terminating at its extremity in a cylindrical surface end bore 118. At its lower end, the cylindrical bore 114 is counterbored as at 120 with the latter in turn being further counterbored at its lower and outer extremity as at 122. Annular shoulders 124 and 126 respectively define the junction of the bore 114 with the counterbore 120 and of the latter with the counterbore 122.

A pair of identical bearing assemblies are received in the opposite ends of the bore 114 in the body 104 and about the extremities of the spindle 102. The same numerals are applied in the drawings to the same parts of these bearing assemblies for convenience of description and illustration.

Each bearing assembly includes a liner 130 of a nonmetallic plastic material such as that sold under the trademark "Delrin" by Du Pont which is slotted along its axial length as at 132 and is further provided with a series of axially extending grooves or channels 134 which are spaced equally from each other and from the slit 132 about the circumference of the liner. The internal surface 136 of the liner 130 is cylindrical to snugly embrace the cylindrical exterior surface of the spindle 102 while the external surface of the liner as at 138 is conical and complementary to the conical surface 116 of the bushing body 104.

The lower bushing assembly likewise includes a nonmetallic liner 130 but the latter is disposed in the counterbore 120 and bears against a sleeve 140 comprising a cylindrical exterior surface 142 together with a conical internal surface 144 which is complementary to that of the exterior surface of the liner 130. At its lower extremity the sleeve 140 is provided with a diametrically enlarged laterally projecting annular flange or rib 146 which is received in the counterbore 122. A thrust ring 148 is likewise received in this counterbore and is retained in place as by a retainer cap 150. The latter is provided with a retaining internal flange 152 at its lower extremity which underlies the end of the spindle 102, and which is apertured centrally as at 154 to form a continuation of the internal bore of the sleeve 102. Thus, the entire assembly 100 may be readily placed upon a mandrel, axle, shaft or other member upon which the bearing assembly is to be mounted with the other member which is to be journaled being placed in embracing relation about the bushing body 104.

Disposed within the cylindrical bore 114 between the two liners 130 is a spring 156 whose extremities engage against washers 158. The washers serve to equalize the thrust of the ends of the spring against the annular flat end faces of the two split liners 130, thereby yieldingly urging each liner into a wear and slack take-up position. It will be noted that there is thus provided a liner 130 between the metallic surface of the spindle 102 and the adjacent surfaces formed by the surface 116 of the bushing body 104 and the corresponding surface 144 of the sleeve 140 which latter is rigidly seated in the bushing body 104.

It is understood that the retainer cap 150 may be pressfitted into place in the counterbore 122 of the enlarged portion 112 of the body or may be releasably secured therein in any other desired suitable manner.

Also the depth of the grooves 134 progressively increases from the small end to the large end of the liners 130 in order that the bottom wall of the grooves 134 shall be of uniform thickness throughout the length of the grooves 134. The grooves 134 thus provide clearances which permit the material of the liners to be circumferentially crowded or compressed thereby insuring a very close fit between the spindle 120 and the liners 130.

The grooves 134 also facilitate distribution of lubricant to both ends of the liners 130 so that it will lubricate all of the relatively moving surfaces.

The conical external surfaces of the liners 130 thus frictionally and non-rotatably grip the surfaces 116 and 144 in the body 104 and sleeve 140 respectively while the cylindrical, grooved internal surfaces of the liners rotatably journal the spindle 102.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bushing assembly for a vehicle steering linkage comprising a cylindrical spindle, a bushing body rotatably journaled on said spindle, a pair of axially spaced bearing liners interposed between said spindle and bushing body, each liner having a conical outer surface with the major diameters disposed in adjacent spaced relation, said bushing body having axially spaced conical inner surfaces complementary to and engaging said bearing liners, and spring means operatively associated with said bearing liners and biasing the same axially in a direction to take up slack between the associated spindle, bearing liners and bushing body and frictionally locking the bearing liners in relation to the bushing body whereby relative rotation occurs between the bearing liners and spindle, each of said bearing liners being of non-metallic construction and provided with a longitudinal slit throughout the length thereof to facilitate yielding movement thereof into slack take up position, each of said bearing liners being provided with a cylindrical interior surface having a plurality of longitudinal grooves therein which are spaced circumferentially thereof, the depth of the internal grooves progressively increasing from the small end to the large end of the bearing liners whereby the bottom wall of the grooves will be of uniform thickness throughout the length thereof for enabling uniform circumferential compression of the bearing liner for insuring a close tolerance rotating fit between the exterior surface of the spindle and the internal surface of the liners.

2. A bushing assembly for a vehicle steering linkage comprising a cylindrical spindle, a bushing body rotatably journaled on said spindle, a pair of axially spaced bearing liners interposed between said spindle and bushing body, each liner having a conical outer surface with the major diameters disposed in adjacent spaced relation, said bushing body having axially spaced conical inner surfaces complementary to and engaging said bearing liners, and spring means operatively associated with said bearing liners and biasing the same axially in a direction to take up slack between the associated spindle, bearing liners and bushing body and frictionally locking the bearing liners in relation to the bushing body whereby relative rotation occurs between the bearing liners and spindle, each of said bearing liners being of non-metallic construction and provided with a longitudinal slit throughout the length thereof to facilitate yielding movement thereof into slack take up position, each of said bearing liners being provided with a cylindrical interior surface having a plurality of longitudinal grooves therein which are spaced circumferentially thereof, one end of said bushing body being provided with an inserted sleeve having a conical inner surface and forming one of the axially spaced conical inner surfaces in the bushing body, said sleeve being disposed rigidly in the bushing body and the conical inner surface thereof being complementary to and engaging the exterior surface of one of said liners.

3. A bushing assembly for a vehicle steering linkage comprising a spindle having longitudinally spaced cylindrical surface areas thereon, a bushing body having a bore extending therethrough and receiving said spindle, said bore in the body having axially spaced longitudinally tapering surface areas thereon substantially in alignment with the cylindrical surface areas on the spindle, a pair of axially spaced bearing liners interposed between the tapering surface areas in the bore and the cylindrical surface areas on the spindle, each bearing liner having a substantially cylindrical inner surface for rotatable bearing engagement with the cylindrical surface areas on the spindle and a tapering outer surface non-rotatably but reciprocally movably engaging the tapering surface areas in the bore, resilient means interposed between and operatively associated with adjacent ends of the bearing liners for biasing the liners axially in relation to each other for frictionally locking the bearing liners in relation to the body and in slack take up relation between the cylindrical surface areas on the spindle and the tapering surface areas in the bore, each of said bearing liners being provided with a longitudinal slit extending throughout the length thereof to facilitate yielding movement thereof into slack take up relation to the spindle and body, one of said tapering surface areas in the bore being formed by an inserted sleeve rigid with the body, said spindle being hollow and provided with a longitudinal bore therethrough and having a length substantially equal to the length of the bushing body, the axial length of each of said liners being substantially longer than the transverse thickness thereof at its thicker end thereby forming a tapering surface having a small degree of taper.

4. The structure as defined in claim 3 wherein each of said bearing liners is provided with a plurality of longitudinal grooves in the cylindrical inner surface thereof, said grooves being spaced circumferentially thereof.

5. A bushing assembly for a vehicle steering linkage comprising a spindle having a cylindrical surface area thereon, a bushing body having a bore extending therethrough and receiving said spindle, said bore in the bushing body having axially spaced longitudinally tapering surface areas thereon in alignment with the cylindrical surface area on the spindle, a pair of axially spaced bearing liners interposed between the tapering surface areas in the bore of the bushing body and the cylindrical surface area on the spindle, each bearing liner having a substantially cylindrical inner surface for rotatable bearing engagement with the cylindrical surface area on the spindle and a tapering outer surface non-rotatably but reciprocally movably engaging the tapering surface areas in the bore of the bushing body, means interposed between and operatively associated with adjacent ends of the bearing liners for biasing the liners axially in relation to each other for frictionally locking the bearing liners non-rotatably in relation to the bushing body and in slack take up relation between the cylindrical surface area on the spindle and the tapering surface areas in the bore of the bushing body, one of said tapering surface areas in the bore being formed by an inserted sleeve within the bore of the body, said sleeve having a tapering inner surface engaged with the tapering outer surface of one of the bearing liners.

6. The structure as defined in claim 5 wherein the cylindrical interior surface of the bearing liners includes a plurality of spaced grooves therein, the depth of the grooves progressively increasing from the small end to the large end of the bearing liners whereby the wall of the liners defining the bottom of the grooves will be of uniform thickness throughout the length thereof for enabling uniform circumferential compression of the bearing liners for insuring a close tolerance rotating fit between the exterior surface of the spindle and the internal surface of the liners.

References Cited

UNITED STATES PATENTS

| | | | |
|---|---|---|---|
| 1,371,666 | 3/1921 | Close et al. | 308—71 |
| 2,913,251 | 11/1959 | Herbenar | 308—71 |
| 1,374,267 | 4/1921 | Whitehead | 308—71 |
| 1,998,728 | 4/1935 | Marles | 308—71 |
| 2,719,064 | 9/1955 | Barnard | 308—70 |
| 3,124,394 | 3/1964 | Rowlett | 280—95 |

FOREIGN PATENTS 612,351  6/1926  France.

MARTIN P. SCHWADRON, *Primary Examiner.*

FRANK SUSKO, *Assistant Examiner.*